United States Patent [19]

Nishida et al.

[11] E Patent Number: Re. 32,475

[45] Reissued Date of Patent: Aug. 18, 1987

[54] OPTICAL WAVEGUIDE TRANSMITTING LIGHT WAVE ENERGY IN SINGLE MODE

[75] Inventors: Shigeo Nishida; Shojiro Kawakami, both of Sendai; Yoichi Ohtaka, Mitaka; Seiichi Onoda, Tokorozawa, all of Japan

[73] Assignee: Hitachi, Ltd., Tokyo, Japan

[21] Appl. No.: 711,820

[22] Filed: Mar. 14, 1985

Related U.S. Patent Documents

Reissue of:

[64] Patent No.: 3,997,241
Issued: Dec. 14, 1976
Appl. No.: 619,518
Filed: Oct. 3, 1975

U.S. Applications:

[63] Continuation-in-part of Ser. No. 476,310, Jun. 4, 1974, abandoned.

[30] Foreign Application Priority Data

Jun. 7, 1973 [JP] Japan ..... 48-64533

[51] Int. Cl.[4] ..... G02B 6/22
[52] U.S. Cl. ..... 350/96.33
[58] Field of Search ..... 350/96.29, 96.30, 96.33

[56] References Cited

U.S. PATENT DOCUMENTS 3,785,718 1/1974 Gloge ..... 350/96.33

*Primary Examiner*—William L. Sikes
*Assistant Examiner*—Frank Gonzalez
*Attorney, Agent, or Firm*—Antonelli, Terry & Wands

[57] ABSTRACT

An optical waveguide for optical communication transmitting light wave energy in a single mode composed of a core of a first transparent dielectric material and successive layers of a second and a third transparent dielectric material coaxially covering the core, the refractive index of the first dielectric material being higher than that of the third dielectric material and the refractive index of the second dielectric material being lower than that of the third dielectric material.

3 Claims, 9 Drawing Figures

OPTICAL WAVEGUIDE TRANSMITTING LIGHT WAVE ENERGY IN SINGLE MODE

Matter enclosed in heavy brackets [ ] appears in the original patent but forms no part of this reissue specification; matter printed in italics indicates the additions made by reissue.

CROSS-REFERENCE TO RELATED APPLICATION

The present application is a continuation-in-part application of an earlier application Ser. No. 476310 filed on June 4, 1974 now abandoned.

BACKGROUND OF THE INVENTION

1. Field of the Invention

The present invention relates to an optical waveguide, and more particularly to an optical waveguide transmitting light wave energy in a single mode for optical communication made of transparent dielectric materials such as glass.

2. Description of the Prior Art

The important things for an optical waveguide for optical communication are that the reduction of light energy in transmission, i.e. the transmission loss of light energy is low, it has a wide band signal frequency response, and the launching of light in the waveguide, i.e. the connection between a light source and a waveguide or the connection between waveguides is easy.

To date various ones have been proposed as the optical waveguide among which a singly cladded optical fiber is known as an effective one as for optical communication. This optical fiber is composed of a transparent central dielectric body, i.e. a core having a high refractive index and a covering layer, i.e. a cladding consisting of a material having a lower refractive index.

The optical characteristic of this singly cladded optical fiber is determined mainly by the parameter expressed by the formula $$\nu = \frac{2a\pi}{\lambda}\sqrt{n_1^2 - n_2^2}$$

where a is the radius of the core, $\lambda$ is the wavelength of light, $n_1$ and $n_2$ are the refractive indices of the core and the cladding, respectively, and the parameter $\nu$ will hereinafter be referred to mainly as the normalized frequency though ordinarily it is called in various ways.

In the range of the value of v no larger than [2.4083] *2.40483* the propagation mode of light in the optical waveguide is single, while a plurality of propagation modes occur in the range of v higher than that value.

For the optical waveguide with the value of v higher than [2.4083] *2.40483* the band width of signal frequency is narrowed by the difference in the group delay for modes.

Consequently, for the optical waveguide for optical communication requiring a wide band the value of $\nu$ has to be designed so that light is propagated in a single mode. To this end the radius (a) of the core or the difference between $n_1$ and $n_2$ has to be made small. However, there is a certain limitation to making the difference between $n_1$ and $n_2$ small from the problem of manufacture or the bending loss. Consequently, the radius of the core has been very small. This makes it very difficult to connect a light source with an optical waveguide or to interconnect optical waveguides.

Further, even in an optical waveguide transmitting light in a single mode, when a light signal has a wide spectral width, a group delay difference occurs in the spectral region to narrow the signal frequency band width.

SUMMARY OF THE INVENTION

Consequently, an object of the present invention is to provide an optical waveguide effective for optical communication.

Another object of the present invention is to provide an optical waveguide having a wide band signal frequency response.

A further object of the present invention is to provide an optical waveguide enabling light to be propagated in a single mode and having a large radius of the core.

A still further object of the present invention is to provide an optical waveguide which is low compared with a conventional optical waveguide in transmission loss occurring when the optical waveguide is bent and which has a wide band signal frequency response in a large acceptable angle multimode transmission.

In order to achieve these objects the present invention is characterized in that unlike a conventional singly cladded optical fiber composed of a core and a cladding a layer of a transparent material having a refractive index lower than that of the cladding is interposed between the core and the cladding.

The above and other objects, features and advantages of the present invention will become more apparent from the following detailed description of the preferred embodiment of the present invention when taken in conjunction with the accomanying drawings.

DESCRIPTION OF THE PREFERRED EMBODIMENT

As a preparation for a description of the present invention a description of a conventional singly cladded optical fiber or optical waveguide will first be made.

Figure 1A:
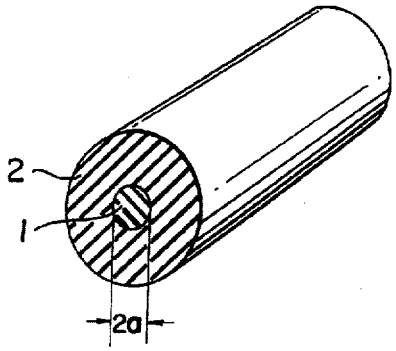
FIG. 1A PRIOR ART
FIG. 1A is a perspective view of a part of a conventional optical waveguide showing the structure thereof.
Figure 1B:
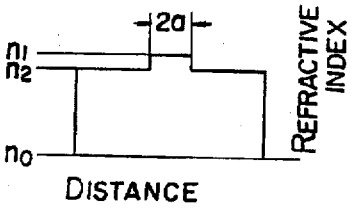
FIG. 1B is a diagram of the distribution of the refractive index on a cross-section of the optical waveguide of FIG. 1A.

A conventional optical waveguide is composed of a core 1 having a high refractive index and a small radius a and a cladding 2 covering the core 1 and having a refractive index lower than that of the core 1 as shown in FIGS. 1A and 1B.

Generally, the mode characteristic of a wave in a waveguide is expressed, if no attenuation is assumed to occur, by $e^{j(\omega t-\beta z)}$, where $\omega$ is the angular frequency of light, t is time, $\beta$ is the phase constant, and z is the position in the propagation direction. Here, what is important to the characteristics of the optical waveguide is the phase constant $\beta$ the value of which is determined by the aforementioned parameter $$\nu = \frac{2\pi a}{\lambda} \sqrt{n_1^2 - n_2^2}.$$

Figure 2:
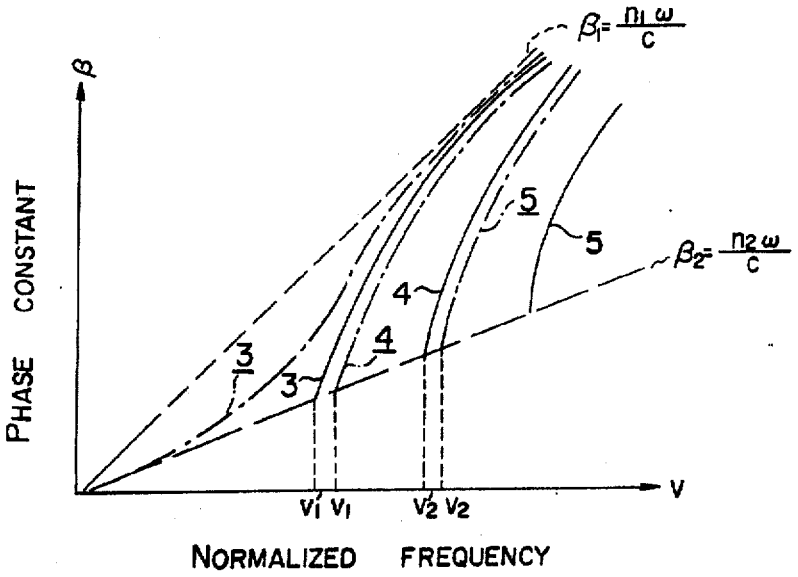
FIG. 2 is a mode characteristic diagram for explaining the signal frequency response of an optical waveguide.

Since the radius a of the core 1 and the refractive indices $n_1$ and $n_2$ of the core 1 and the cladding 2 are determined if the optical waveguide is given and since the relation $2\pi/\lambda=\omega$ stands, the normalized frequency $\nu$ is a function of the angular frequency $\omega$. Consequently, the relation between the phase constant $\beta$ and the normalized frequency $\nu$ is expressed by the relation between the phase constant $\beta$ and the angular frequency $\omega$. It is known that this relation is as shown in FIG. 2. In FIG. 2 the ordinate is the phase constant $\beta$ and the abscissa is the normalized frequency $\nu$. Two asymptotes $\beta_1$ and $\beta_2$ represent the propagation constants of light in the media having the refractive indices $n_1$ and $n_2$, respectively. Since the difference between the refractive indices $n_1$ and $n_2$ is very small, the angle between the two asymptotes $\beta_1$ and $\beta_2$ is very small. However, for easy observation the angle is shown magnified in FIG. 2. Dot-dash or chain lines represent the characteristics of a conventional optical waveguide, while solid lines represent the characteristics of the optical waveguide according to the present invention which will be described below in detail.

The curve 3 is the transmission characteristic of the mode $HE_{11}$, the curve 4 is the transmission characteristics of the degenerate modes $HE_{21}$, $TM_{01}$ and $TE_{01}$, and the curve 5 is the transmission characteristics of the degenerate modes $EH_{11}$, $HE_{31}$ and $HE_{12}$. In fact there are a further number of curves as the angular frequency $\omega$ increases. However, since they are directly unnecessary for a description of the present invention, a description thereof will not be made for the sake of simplicity.

As is evident from these transmission characteristics, each component mode approaches the asymptote $\beta_1$ as the normalized frequency v becomes large, while it terminates at the asymptote $\beta_2$ when the normalized frequency v is small. This terminating point is called the "cut off". The curve 3 does not have the "cut off". For this reason the curve 3 is convex downward at the range lower than $\nu_1$.

At the range lower than $\nu_1$ only the curve 3 exists. This fact indicates that the mode in the waveguide is single. It is known that the value of $\nu_1$ at this time is [2.4083] *2.40483*.

Figure 3A:
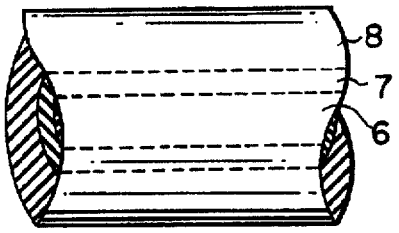
FIGS. 3A, 3B and 3C are a side view of a part of, a cross-sectional view of and a refractive index distribution diagram of an optical waveguide according to the present invention, respectively.
Figure 3B:
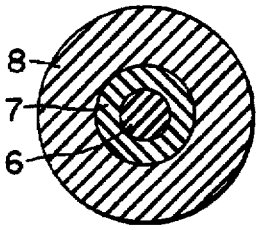
Figure 3C:
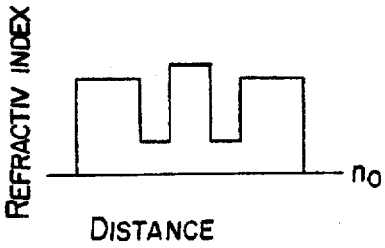

FIGS. 3A to 3C show the structure of the optical waveguide according to the present invention. This structure is such that a third transparent dielectric layer is interposed between the core 1 and the cladding 2 of the singly cladded optical fiber of FIG. 1. That is, this structure consists of a core 6 of a first transparent dielectric material and second and third transparent dielectric layers 7 and 8 cladding the core 6, the refractive index of the first dielectric material 6 being higher than that of the third dielectric material 8, and the refractive index of the second dielectric material 7 being lower that that of the third dielectric material 8.

The thickness and the refractive index of the second layer 7 vary depending on the frequency of light, the diameter of the core, the difference between the refractive indices of the first and third dielectric materials 6 and 8, and the use of the optical waveguide. The thickness of the second dielectric layer 7 effective for the purpose of the present invention is 0.05 to 5 times the radius of the core.

As the dielectric material glass is at present most desirable from the standpoint of loss. However, it is evident that high polymers may be used as well.

The characteristics, effect and advantages of the optical waveguide according to the present invention will next be described.

The solid curves 3, 4 and 5 in FIG. 2 represent the mode characteristics of the optical waveguide according to the present invention. The curve 3 is the transmission characteristic of the mode $HE_{11}$, the curve 4 is those of the degenerate modes $HE_{21}$, $TM_{01}$ and $TE_{01}$, the curve 5 is those of the degenerate modes $EH_{11}$, $HE_{31}$ and $HE_{12}$. Though these transmission characteristics can be theoretically derived, its calculating formula is very complicated. Hence, these transmission characteristics will be derived referring to a slab type optical waveguide having qualitatively the same properties as those of a cylindrical one.

Figure 4A:
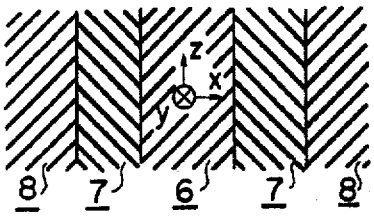
FIGS. 4A and 4B are a cross-sectional view of a part of and a refractive index distribution diagram of a slab waveguide, respectively, for explaining the principle of the present invention.
Figure 4B:
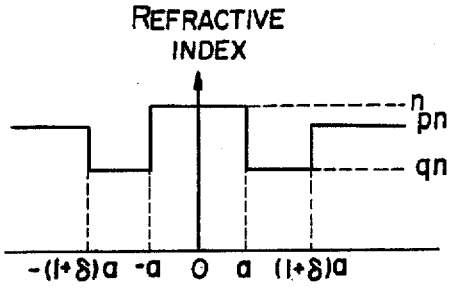

FIGS. 4A and 4B are of a slab type optical waveguide. Materials 6, 7 and 8 are the same materials as those 6, 7 and 8 in FIG. 3B, respectively. The refractive indices of these materials 6, 7 and 8 are denoded by n, qn and pn, respectively. It is assumed that this waveguide is uniform in the Y direction and light is propagated in the Z direction. In such a waveguide there are the transversal electric (TE) modes and the transversal magnetic (TM) modes. However, since there is no essential difference between the transmission characteristics of the two modes, a description will be made below of the TE mode.

The electric field $E_y$ of the TE mode in the Y direction is assumed to be $$\left.\begin{aligned} E_v &= C_1\begin{pmatrix}\cos\\ \sin\end{pmatrix}\frac{u_1x}{a}\ \ldots\ |x| < a \\ &= C_2\exp\left(-\frac{u_2x}{a}\right) + C_2\exp\left(\frac{u_2x}{a}\right)\ \ldots\ a < x < (1+\delta)a \\ &= \pm C_3\exp\left(\frac{u_3x}{a}\right) \pm C_2\exp\left(-\frac{u_3x}{a}\right)\ \ldots\ -(1+\delta)a < x < -a \\ &= \pm C_4\exp\left(-\frac{u_2|x|}{a}\right)\ \ldots\ (1+\delta)a < |x| \end{aligned}\right\} \quad (1)$$

where $C_1$ to $C_4$ are unknown coefficients, and $u_1$, $u_2$ and $u_3$ are eigen values at 6, 7 and 8, respectively, in FIG. 4. The sign $$\begin{pmatrix}\cos\\ \sin\end{pmatrix}$$

and the double sign $\pm$ correspond to the even and odd modes. If the boundary conditions corresponding to the structure of FIG. 4 are applied to Formula (1), the following characteristic equation results $$u_1\begin{pmatrix}\tan\\ -\cot\end{pmatrix} u_1 = \frac{u_2 + u_2\tanh\delta u_2}{u_2 + u_2\tanh\delta u_2}\, u_2 \quad (2)$$

On the other hand, for Formula (1) to satisfy the wave equation the following formulae have to be satisfied $$-\left(\frac{u_1}{a}\right)^2 + n^2k_o^2 = \beta^2 \quad (3)$$

$$\left(\frac{u_2}{a}\right)^2 + q^2k_o^2 = \beta^2$$

$$\left(\frac{u_2}{a}\right)^2 + p^2k_o^2 = \beta^2$$

where $$k_o = \frac{2\pi}{\lambda},\ \lambda:$$

the wavelength of light in air.

Here, as is usually the case with a dielectric optical waveguide the normalized frequency is defined as follows:

$$v^2 = u_1^2 + u_3^2 = (1-p^2)n^2k_o^2a^2 \quad (4)$$

From Formulae (3)

$$u_2^2 = A^2u_1^2 + B^2u_3^2 \quad (5)$$

where $$A^2 = \frac{p^2 - q^2}{1 - p^2}$$

$$B^2 = \frac{1 - q^2}{1 - p^2}$$

Here, since p is ordinarily of a very near value to 1 (for example, 0.99 to 0.999), assuming that $1-p<<1-q$, $$A \approx B$$

and Formula (5) becomes $$u_2 \approx Av$$

The cut off of the mode will next be considered. The cut off point is given by $u_3=0$. If the value of v at the cut off point is denoted by $v_c$, $$v_c = \begin{pmatrix}\tan^{-1}\\ -\cot^{-1}\end{pmatrix} A \quad (6)$$

when $\delta A$ is higher than about 2. From the above formula it can be seen that the cut off exists for the lowest degree of mode $TE_o$ when $\delta A^2>1$. Consequently, unless $\delta$ is very small, the cut off ordinarily exists for the mode $TE_o$ when the condition $1-p<<1-q$ stands.

Assuming that A is larger than 1, from Formula (6) the cuf off $v_c$ of the mode $TE_{2m}$ is given approximately by $v_c \approx (2m+1)\pi'2-1/A$ ($m=0, 1, 2, \ldots$) and the cut off $v_c$ of the mode $TE_{2m-1}$ is given by $v_c \approx m\pi 1/A$ ($m=1, 2, \ldots$).

Consequently, the single mode region of the TE mode is given by $$\frac{\pi}{2} - \frac{1}{A} < v < \pi - \frac{1}{A}$$

On the other hand, for a slab type waveguide corresponding to a conventional singly cladded waveguide lacking the layer 7 the single mode region is $$0 < v < \pi/2$$

Consequently, the upper limit of the single mode region for the waveguide having the structure of FIGS. 4A and 4B can be made $$2\left(1-\frac{1}{\pi A}\right)$$

times as high as that of the conventional waveguide. When A is large, it is 2 times.

In the above the transmission characteristics are described referring to a slab type waveguide. However, even if it is transformed to a cylindrical one, similar relations stand qualitatively as shown in FIG. 2.

This relation is approximated by the equation:

$$\frac{j_{0.1}}{B}-1<\frac{2a\pi n}{\lambda}\sqrt{1-q^2}<\frac{j_{1.1}}{B}-1 \quad (7)$$

where $j_{0.1}$ and $j_{1.1}$ are first roots of Bessel functions $J_0(\chi)=0$ and $J_1(\chi)=0$, respectively, and $j_{0.1}=$ [2.4083] *2.40483* and $j_{1.1}=$ [3.8327] *3.83171*. As described above, when $1-p<<1-q$, i.e., $$\frac{1-p}{1-q}<\frac{1}{10}\cdot\frac{j_{0.1}}{B}>>1,\ \frac{j_{1.1}}{B}>>1.$$

$j_{1.1}/B<<1$. Thus, equation (7) result as follows:

$$2.40483<\nu\left(=\frac{2a\pi n}{\lambda}\sqrt{1-p^2}\right)<3.83171$$

Consequently, in the optical waveguide according to the present invention the cut off occurs for the lowest degree of mode $HE_{11}$ and the single mode region becomes $\nu_1'$ to $\nu_2'$ to magnify the upper limit of the lowest degree of mode.

Next, the advantages resulting from the characteristics of the optical waveguide according to the present invention becoming as shown by the solid lines in FIG. 2 will be described.

First, the diameter of the core of the waveguide capable of performing single mode transmission can be extended. For example, since the cut off normalized frequency $$\nu_c=\frac{2\pi a}{\lambda}\sqrt{n_1^2-n_2^2}$$

changes from [2.408] *2.40483* around [3.8317] *3.83171*, the radius a can be extended by about 60% when $$\frac{2\pi}{\lambda}\sqrt{n_1^2-n_2^2}$$

is constant.

Second, when the single mode transmission is performed, the single frequency band width can be extended compared with the single mode transmission by a conventional optical waveguide.

The factor to determine the single frequency band width of the waveguide is the group velocity characteristic of light in the waveguide. The group velocity is expressed by $d\omega/d\beta$ as is well known. The group velocity of signal light generally varies depending on the frequency of the light. When the spectral width of the signal light is wide, a delay distortion occurs due to the difference in the group velocity therein to narrow the transmission capacity of the waveguide and hence the signal frequency band width.

The differential $d(d\omega/d\beta)/d\omega$ of the group velocity with respect to the frequency will hereinafter be referred to as the dispersion. For this dispersion there are the dispersion due to the refractive index characteristic of the material of the waveguide (hereinafter referred to as the material dispersion) and the dispersion due to the characteristic inherent in the propagation mode (hereinafter referred to as the mode dispersion). The combination of both dispersions will hereinafter be referred to as the overall dispersion.

The dielectric, the material of the ordinary waveguide, decreases in the refractive index with the increase in the waveguide of light at the wavelength range of from 0.6 to 1.06 micron. Consequently, the material dispersion depending on the refractive characteristic of the material is negative.

On the other hand, the mode dispersion is also negative due to the fact that the curve 3 shown in FIG. 2 is downwardly convex at the range 0 to $\omega_1$ corresponding to the range 0 to $\nu_1$, i.e. at the single mode region. Consequently, the negativity is further amplified for the overall dispersion. For example, the overall dispersion at the near infrared region of a wavelength of 1 micron for borosilicate glass is about $-10^{-8}$ meter. If a light pulse having a spectral width of 100 angstroms is transmitted through such an optical waveguide, there occurs a pulse widening of about 5 ns per 1 km. That is, even for an optical waveguide of the single mode the signal frequency band width is considerably limited for the transmission of a light signal having a spectral width.

However, in the optical waveguide according to the present invention the characteristic of the single mode region has the cut off as shown at 3 in FIG. 2 so that the mode dispersion is positive. Consequently, the positivity of the mode dispersion and the negativity of the material dispersion compensate for each other to diminish the absolute value of the overall dispersion. For this reason the limitation due to the group velocity dispersion is moderated and the signal frequency band width is extended.

The optical waveguide according to the present invention has a further advantage compared with a conventional waveguide that the energy of light is more concentrated in the core.

Figure 5:
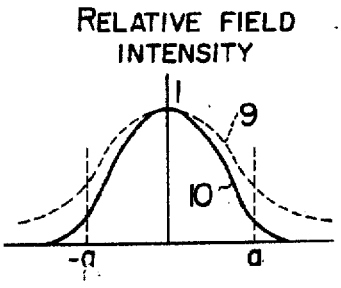
FIG. 5 is a diagram of the light energy distribution in an optical waveguide.

As described above, since, in the optical waveguide according to the present invention, the upper limit of the single mode region is magnified, the eigen value $u_2$ is augmented, so that the energy distribution is as shown in FIG. 5. In FIG. 5 the abscissa is the radial direction of the waveguide and the ordinate is the intensity of light which is normalized to 1 at the center of the waveguide. Such a concentration of the energy of light in the core provides the advantage that the loss due to the bending of the waveguide is reduced and the acceptable angle of the waveguide is increased. Considering the contribution of the transmission loss of the material of each layer composing the waveguide to the loss of the waveguide, the latter is almost determined by the loss of the core material. Consequently, as the layers other than the core, materials having a larger loss than conventional ones can be employed, so that the manufacture of the waveguide is easier than a conventional one.

We claim:

1. An optical waveguide transmitting light wave energy in a single mode comprising:

a solid body of a first transparent dielectric material having a uniform refractive index n and a circular cross-section having a radius dimension a;

a layer of a second transparent dielectric material formed coaxially on the solid body and having a refractive index qn and a thickness δa;

a layer of a third transparent dielectric material surrounding said layer of the second transparent dielectric material and having a refractive index pn; and said three transparent dielectric materials having a following relationship:

$$\frac{2.40483}{\sqrt{\frac{1-p^2}{1-q^2}}} - 1 < \frac{2a\pi n}{\lambda}\sqrt{1-q^2} < \frac{3.83171}{\sqrt{\frac{1-p^2}{1-q^2}}} - 1,$$

where μ is an optical wavelength, *p is smaller than 1 and q is smaller than p.*

2. An optical waveguide according to claim 1 in which the thickness of the layer of the second dielectric material is 0.05 to 5 times the radius of the solid body of the first dielectric material.

3. An optical waveguide according to claim 1 in which said three transparent dielectric materials having a following relationship:

$$\frac{1-p}{1-q} < 0.1 \text{ and } 2.40483 < \frac{2\pi an}{\lambda}\sqrt{1-p^2} < 3.83171$$

* * * * *

UNITED STATES PATENT AND TRADEMARK OFFICE

CERTIFICATE OF CORRECTION

PATENT NO. : Re. 32,475

DATED : Aug. 18, 1987

INVENTOR(S) : Nishida et al.

It is certified that error appears in the above-identified patent and that said Letters Patent is hereby corrected as shown below:

IN THE TITLE PAGE:

Block [73], delete "Assignee: Hitachi, Ltd., Tokyo, Japan" and insert --Assignee: Hitachi, Ltd., Tokyo, Japan, one-half interest; and Shojiro Kawakami, Sendai-shi, Japan, one-half interest--

Signed and Sealed this

Twenty-fourth Day of January, 1989

*Attest:*

DONALD J. QUIGG

*Attesting Officer*

*Commissioner of Patents and Trademarks*